(12) United States Patent
Takahata

(10) Patent No.: US 10,853,964 B2
(45) Date of Patent: Dec. 1, 2020

(54) IMAGE RECOGNITION SYSTEM

(71) Applicant: Panasonic Intellectual Property Management Co., Ltd., Osaka (JP)

(72) Inventor: Atsushi Takahata, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 156 days.

(21) Appl. No.: 16/088,472

(22) PCT Filed: Apr. 26, 2017

(86) PCT No.: PCT/JP2017/016516
§ 371 (c)(1),
(2) Date: Sep. 26, 2018

(87) PCT Pub. No.: WO2018/012084
PCT Pub. Date: Jan. 18, 2018

(65) Prior Publication Data
US 2019/0114799 A1 Apr. 18, 2019

(30) Foreign Application Priority Data
Jul. 15, 2016 (JP) .................................. 2016-140341

(51) Int. Cl.
*G06T 7/70* (2017.01)
*G06K 9/00* (2006.01)
(Continued)

(52) U.S. Cl.
CPC ............ *G06T 7/70* (2017.01); *G06K 9/00805* (2013.01); *G06K 9/00979* (2013.01);
(Continued)

(58) Field of Classification Search
CPC .................................................. G06K 9/00993
See application file for complete search history.

(56) References Cited

U.S. PATENT DOCUMENTS

2002/0051578 A1 5/2002 Imagawa et al.
2014/0023247 A1 1/2014 Kuwahara et al.
(Continued)

FOREIGN PATENT DOCUMENTS

JP 5-314089 11/1993
JP 2001-333428 11/2001
(Continued)

OTHER PUBLICATIONS

The Extended European Search Report dated Apr. 3, 2019 for European Patent Application No. 17827218.3.
(Continued)

*Primary Examiner* — Ross Varndell
(74) *Attorney, Agent, or Firm* — Greenblum & Bernstein, P.L.C.

(57) ABSTRACT

An image recognition system includes a first computer for detecting a recognition target from image data, and a second computer for identifying the recognition target detected by the first computer. The first computer and the second computer are disposed at positions physically separated from each other. When the first computer sends image data to the second computer, the second computer sends to the first computer a detection parameter group used for detection via a communication path. The detection parameter group is included in a recognition parameter group that is dynamically changed and used for image recognition processing of the image data.

12 Claims, 14 Drawing Sheets

(51) Int. Cl.
*H04N 21/84* (2011.01)
*G06K 9/62* (2006.01)
*G06K 9/68* (2006.01)

(52) U.S. Cl.
CPC .......... *H04N 21/84* (2013.01); *G06K 9/6255* (2013.01); *G06K 9/6807* (2013.01); *G06T 2207/20084* (2013.01)

(56) References Cited

U.S. PATENT DOCUMENTS

| | | | | |
|---|---|---|---|---|
| 2014/0089232 | A1* | 3/2014 | Buibas | G06N 3/08 706/11 |
| 2015/0049195 | A1* | 2/2015 | Ishigaki | G06F 16/583 348/148 |
| 2015/0363670 | A1* | 12/2015 | Sugishita | G06K 9/00771 382/155 |
| 2018/0278827 | A1* | 9/2018 | Barnes | G01C 19/5776 |
| 2018/0336426 | A1* | 11/2018 | Suzuki | G08G 1/04 |

FOREIGN PATENT DOCUMENTS

| | | |
|---|---|---|
| JP | 2002-203240 | 7/2002 |
| JP | 2014-022970 | 2/2014 |

OTHER PUBLICATIONS

Jo Kichun et al: "Development of Autonomous Car-Part II: A Case Study on the Implementation of an Autonomous Driving System Based on Distributed Architecture", IEEE Transactions on Industrial Electronics, IEEE Service Center, Piscataway, NJ, USA, vol. 62, No. 8, Aug. 1, 2015 (Aug. 1, 2015), pp. 5119-5132, XP011585875.
Anelia Angelova et al: "Real-Time Pedestrian Detection With Deep Network Cascades", Design for Manufacturability Through Design-Process Integration III, Jan. 1, 2015 (Jan. 1, 2015), XP055574259.
International Search Report of PCT application No. PCT/JP2017/016516 dated Aug. 1, 2017.
Naoyuki Tsuruta, "Basics of Image Pattern Recognition and Machine Vision", Fukuoka System LSI College, Advanced Semiconductor Dept., Fukuoka Industry, Science & Technology Foundation, Nov. 24, 2015.
Notice of Reasons for Refusal in Japan dated Sep. 10, 2019 for the related Japanese Patent Application No. 2016-140341.

* cited by examiner

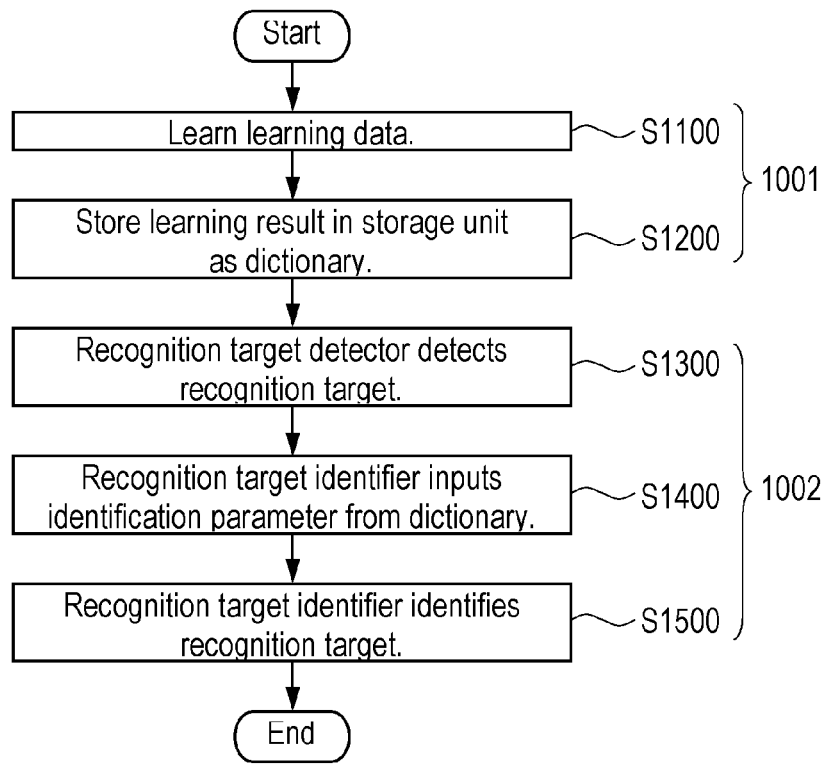
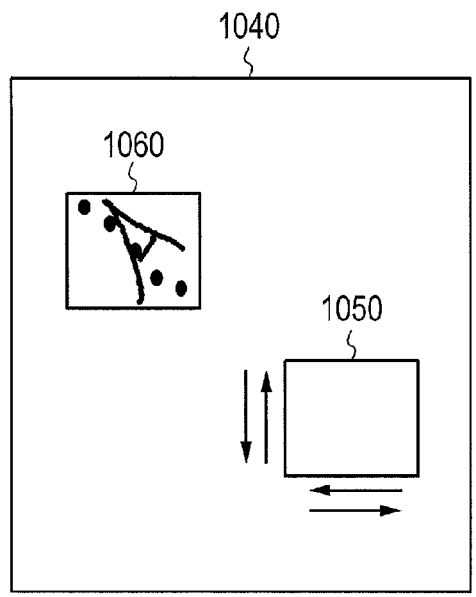

FC: First controller RTD: Recognition target detector
FT: First transmitter FR: First receiver
SR: Second receiver ST: Second transmitter
RTI: Recognition target identifier SC: Second controller
ID: Image data CS: Control signal FPD: Feature point data RTD: Recognition target detector
RTI: Recognition target identifier FIP: First image processor
RTD: Recognition target detector
RTI: Recognition target identifier SIP: Second image processor

IMAGE RECOGNITION SYSTEM

This application is a U.S. national stage application of the PCT International Application No. PCT/JP2017/016516 filed on Apr. 26, 2017, which claims the benefit of foreign priority of Japanese patent application No. 2016-140341 filed on Jul. 15, 2016, the contents all of which are incorporated herein by reference

TECHNICAL FIELD

The present disclosure relates to image recognition systems.

BACKGROUND ART

Image recognition systems built in machine such as autonomous vehicles and robots that are essential to full-automation of factories are increasingly used for recognizing objects (recognition targets) needed by the machines. For these image recognition systems, a range of image recognition algorithms for recognizing recognition targets have been developed and studied (PTL1 and NPL1).

CITATION LIST

Patent Literature

PTL 1: Japanese Patent Unexamined Publication No. 2002-203240 Nonpatent Literature
NPL 1: Basics of Image Pattern Recognition and Machine Vision, Fukuoka System LSI College

SUMMARY OF THE INVENTION

The present disclosure provides an image recognition system that facilitates thermal design of housings and physical layouts.

The image recognition system of the present disclosure includes a first computer, a second computer, and a communication path provided between the first computer and the second computer. The first computer, in operation, detects a recognition target from image data, using a detection parameter group. The second computer, in operation, identifies the recognition target detected by the first computer. The first computer and the second computer are disposed at positions physically separated from each other. The detection parameter group is included in a recognition parameter group that is dynamically changed and used for image recognition processing of image data. When the first computer sends the image data to the second computer, the second computer sends the detection parameter group to the first computer via the communication path.

The present disclosure can provide the image recognition system that facilitates thermal design of housings and physical layouts.

BRIEF DESCRIPTION OF DRAWINGS

FIG. 3A is a flow chart illustrating processing of the image recognition system in accordance with the first exemplary embodiment.
FIG. 3B is a diagram illustrating an example of detection of a recognition target in image recognition processing.

DESCRIPTION OF EMBODIMENTS

Figure 12A:
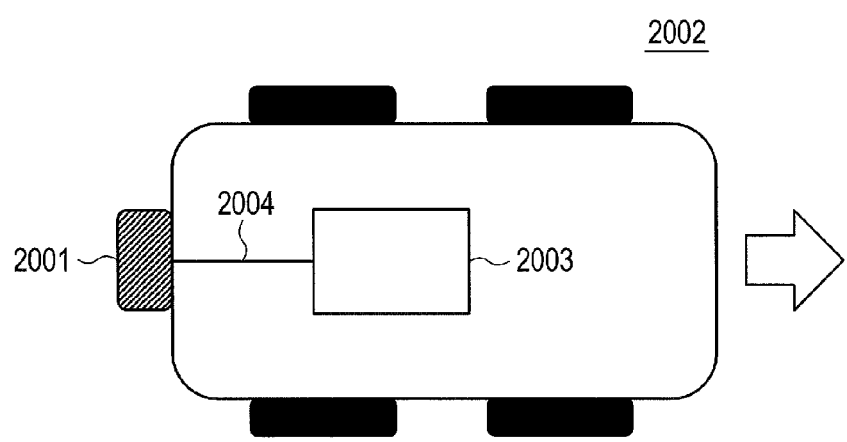
FIG. 12A is a diagram of an example of a vehicle equipped with the image recognition system.

Prior to describing exemplary embodiments of the present disclosure, a background to reaching an idea of the present disclosure is described. FIG. 12A shows an example of vehicle 2002 equipped with an image recognition system. The image recognition system implements an image recognition algorithm for recognizing a recognition target, such as a pedestrian and other vehicle. Vehicle 2002 includes on-vehicle camera 2001 and electronic control unit (ECU) 2003 that processes an input from on-vehicle camera 2001. On-vehicle camera 2001 and ECU 2003 send and receive image data and control signal via mutual communication path 2004.

Figure 12B:
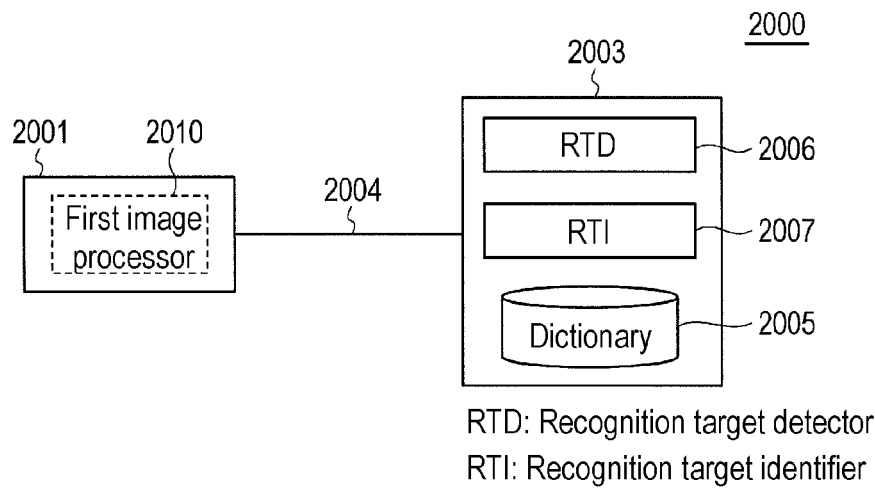
FIG. 12B is a block diagram of an example of the image recognition system.

FIG. 12B is a diagram of image recognition system 2000 that is an example of the image recognition system. On-vehicle camera 2001 and ECU 2003 are disposed at positions physically separated from each other. First image processor 2010 in a housing of on-vehicle camera 2001 processes an image captured by on-vehicle camera 2001. Then, ECU 2003 receives a result of image processing from on-vehicle camera 2001 via mutual communication path 2004. Then, recognition target detector 2006 in ECU 2003 detects a recognition target, and recognition target identifier 2007 identifies the recognition target with reference to dictionary 2005 to recognize the recognition target. In image recognition system 2000, ECU 2003 performs image recognition processing.

Figure 12C:
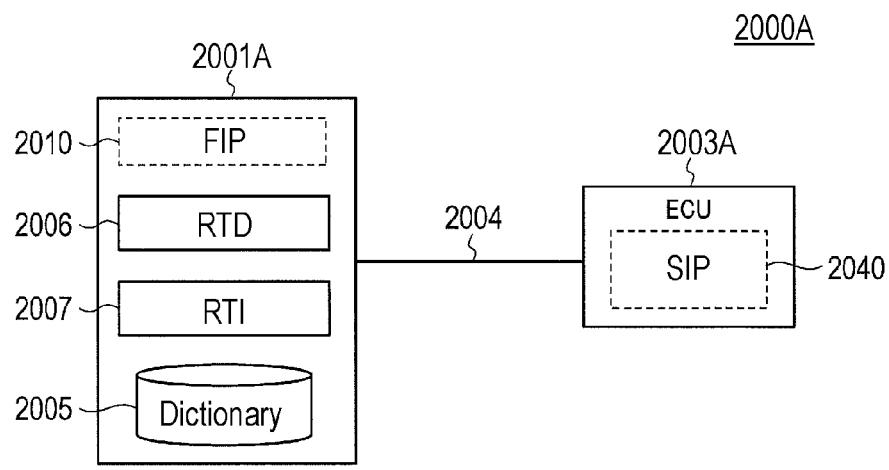
FIG. 12C is a block diagram of another example of the image recognition system.

FIG. 12C is a diagram of image recognition system 2000A that is another example of the image recognition system. On-vehicle camera 2001A and ECU 2003A are disposed at positions physically separated from each other. First image processor 2010 in on-vehicle camera 2001A processes an image captured by on-vehicle camera 2001A. Then, recognition target detector 2006 in on-vehicle camera 2001A detects a recognition target, and recognition target identifier 2007 in on-vehicle camera 2001A identifies the recognition target with reference to dictionary 2005 to recognize the recognition target. Then, ECU 2003A receives information on the recognition target that is recognized together with image data from on-vehicle camera 2001A via mutual communication path 2004. As required, second image processor 2040 in a housing of ECU 2003A performs image processing of the image data. In image recognition system 2000A, on-vehicle camera 2001A performs image recognition processing.

Figure 13:
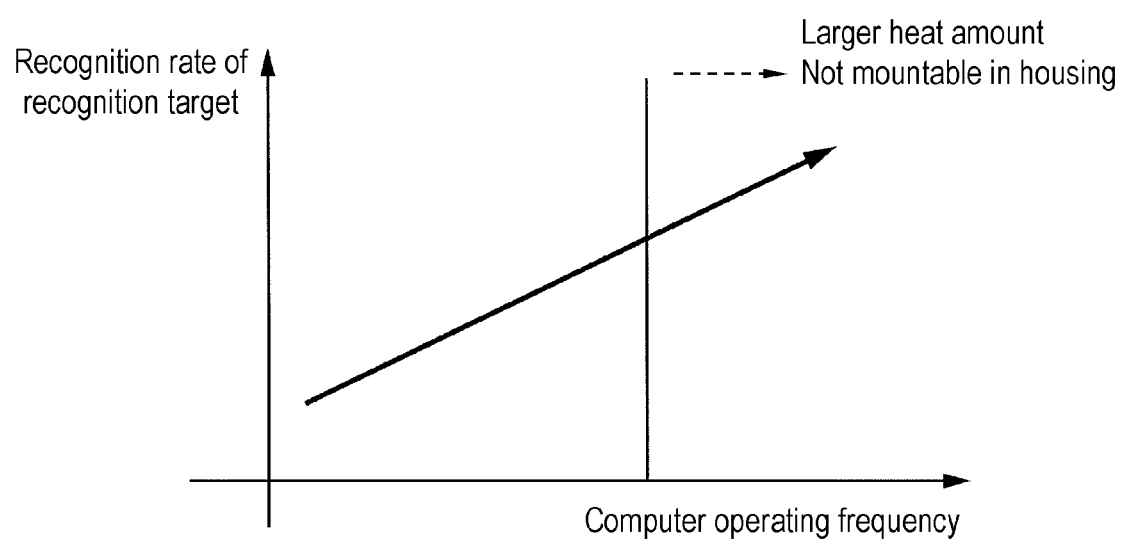
FIG. 13 is a graph illustrating a relation of a computer operating frequency and a recognition rate of recognition target.

FIG. 13 is a graph illustrating a relation of a computer operating frequency and a recognition rate of recognition target. As shown in FIG. 13, in the image recognition processing, the computer performance generally improves as the computer operating frequency is increased, and thus the recognition rate of recognition target can also be increased. However, a heat amount due to operation also increases as the operating frequency is increased. When the computer operating frequency reaches a certain critical point, heat generated in line with operation cannot be sufficiently released. As a result, a thermal design of the housing of the on-vehicle camera or ECU in which an image recognition means is mounted becomes difficult, and therefore it becomes difficult to install the image recognition means in the on-vehicle camera or ECU.

In other words, integration of image recognition processing that requires a high recognition rate in the camera or ECU will increase an operating frequency required for image recognition processing and a memory capacity required for image recognition processing. As a result, a thermal design of housing and a physical layout become difficult to install the image recognition means in the housing of the on-vehicle camera or ECU.

Exemplary embodiments of the present disclosure for solving the above disadvantage are described below with reference to drawings.

First Exemplary Embodiment

Figure 1:
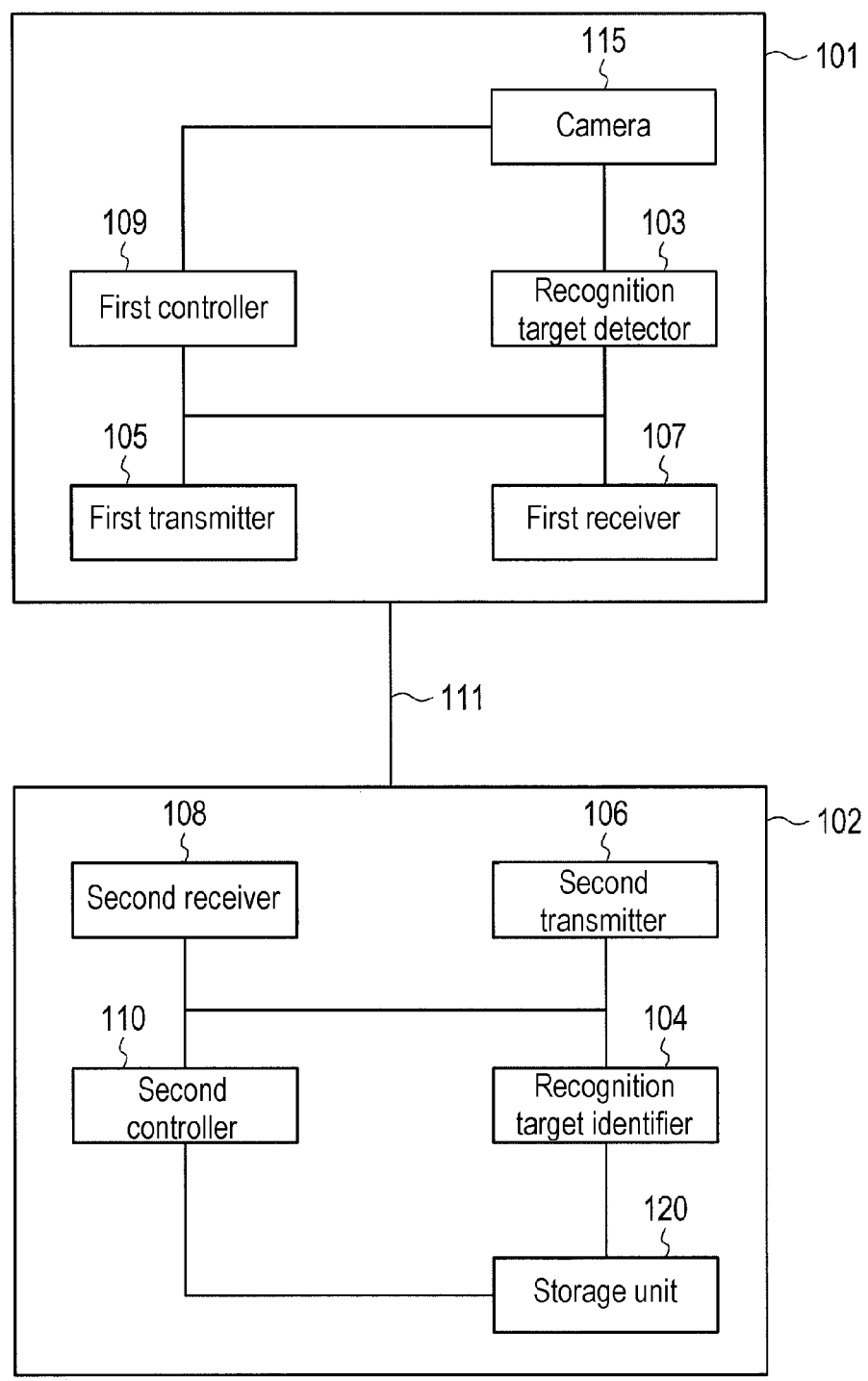
FIG. 1 is a diagram of an image recognition system in accordance with a first exemplary embodiment.

FIG. 1 is a block diagram of image recognition system 100 according to a first exemplary embodiment of the present disclosure. Image recognition system 100 includes first computer 101, second computer 102, and communication path 111. First computer 101 is, for example, an on-vehicle camera. Second computer 102 is, for example, an ECU.

First computer 101 is disposed at a position physically separated from second computer 102. First computer 101 and second computer 102 are disposed in, for example, separate housings, but they may be disposed in the same housing.

Communication path 111 couples first computer 101 and second computer 102 in a communicable manner. Communication via communication path 111 is typically wireless communication, but wired communication is also applicable.

First computer 101 includes recognition target detector 103, first transmitter 105, first receiver 107, first controller 109, and camera 115.

Recognition target detector 103 detects a recognition target from an image captured by camera 115. For example, recognition target detector 103 detects the recognition target, using a neural network described later.

First transmitter 105 sends data to second computer 102. For example, the sent data includes image data and data of a feature point related to the recognition target included in the image. First receiver 107 receives data from second computer 102. For example, the received data includes a detection parameter group included in a recognition parameter group used for image recognition processing. The detection parameter group consists of parameters used for detecting the recognition target from the image.

First controller 109 controls operations of first transmitter 105, first receiver 107, and camera 115. Each of recognition target detector 103, first transmitter 105, first receiver 107, and first controller 109 may be configured, for example, with hardware that is one or more elements of first computer 101. Alternatively, they may be implemented with programs executed by first computer 101.

Second computer 102 includes recognition target identifier 104, second transmitter 106, second receiver 108, second controller 110, and storage unit 120.

Recognition target identifier 104 identifies the recognition target from the image captured by camera 115. For example, recognition target identifier 104 identifies the recognition target included in the image based on information including the image data and feature point data. The image data is received via communication path 111, and is data of the image captured by camera 115. The feature point data is detected by recognition target detector 103, which is data of feature point related to the recognition target included in the image. For example, recognition target identifier 104 identifies the recognition target, using a neural network described later.

Second transmitter 106 sends data to first computer 101. For example, the sent data includes the detection parameter group. Second receiver 108 receives data from first computer 101. For example, the received data includes data of feature point related to the recognition target.

Second controller 110 controls operations of recognition target identifier 104, second transmitter 106, second receiver 108, and storage unit 120. Each of recognition target identifier 104, second transmitter 106, second receiver 108, and second controller 110 may be configured with, for example, hardware that is one or more elements of second computer 102. Alternatively, they may be implemented with programs executed by second computer 102.

Storage unit 120 stores information required for identifying the recognition target as a dictionary. For example, storage unit 120 stores dictionary 1006 as described later with reference to FIG. 3C.

Figure 2A:
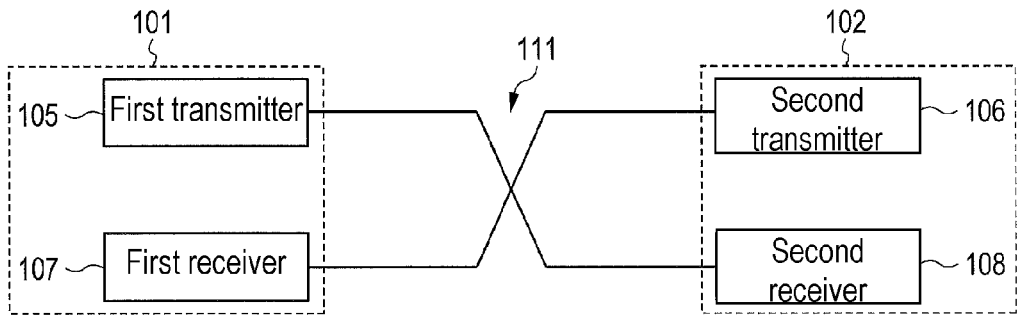
FIG. 2A is a diagram illustrating an example of a communication path adopting a full-duplex communication system.

FIG. 2A shows an example of communication path 111 adopting full-duplex communication system. First transmitter 105 of first computer 101 is coupled to second receiver 108 of second computer 102. First receiver 107 of first computer 101 is coupled to second transmitter 106 of second computer 102. In this case, connections use two systems, and each of first computer 101 and second computer 102 can simultaneously send and receive data.

Figure 2B:
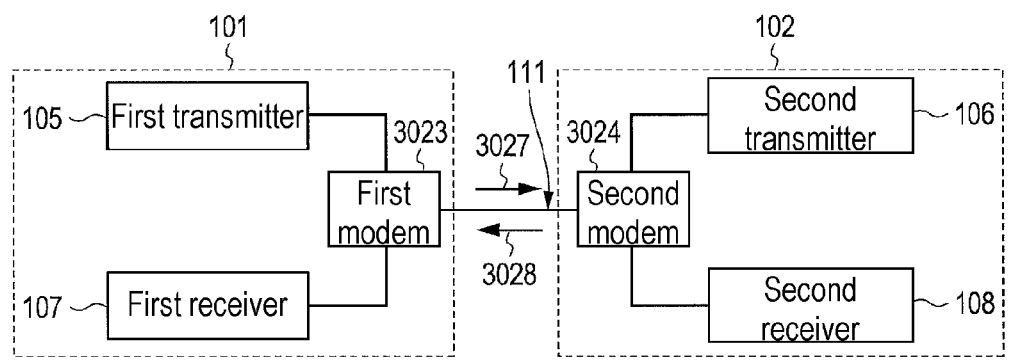
FIG. 2B is a diagram illustrating another example of the communication path adopting the full-duplex communication system.

FIG. 2B shows another example of communication path 111 adopting the full-duplex communication system. First modem 3023 is coupled to first transmitter 105, first receiver 107, and second modem 3024. Second modem 3024 is coupled to second transmitter 106, second receiver 108, and first modem 3023. First modem 3023 is, for example, provided inside the housing of first computer 101, and second modem 3024 is, for example, provided inside the housing of second computer 102.

First modem 3023 and second modem 3024 can simultaneously and bidirectionally transfer communication signals on a single bus, typically by frequency division. Accordingly, first computer 101, for example, can perform transmission 3027 and reception 3028 simultaneously.

Figure 2C:
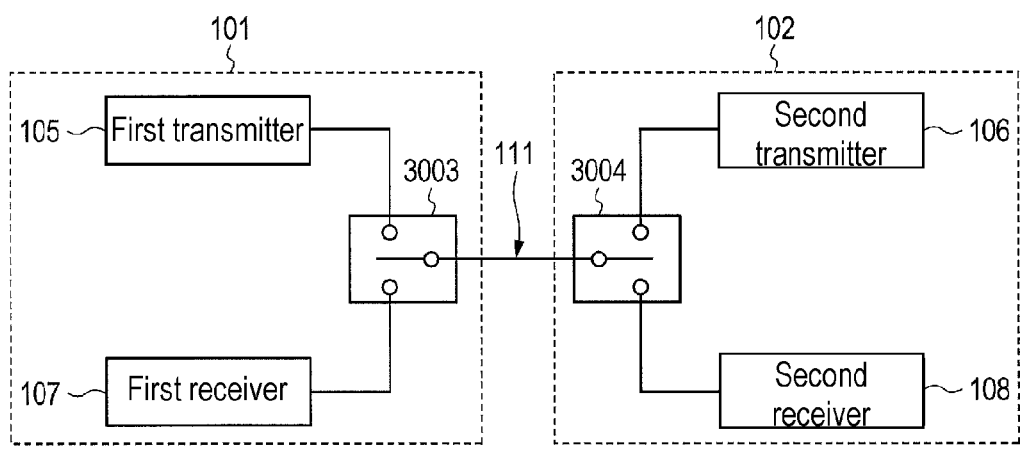
FIG. 2C is a diagram illustrating an example of the communication path adopting a semi-duplex communication system.

FIG. 2C shows an example of communication path 111 adopting a half-duplex communication system. First switch 3003 is coupled to second switch 3004 to switch connection of second switch 3004 between first transmitter 105 and first receiver 107. Second switch 3004 is connected to first switch 3003 to switch connection of first switch 3003 between second transmitter 106 and second receiver 108. First switch 3003 is, for example, provided inside the housing of first computer 101. Second switch 3004, for example, is provided inside the housing of second computer 102.

To send data from first computer 101, connection of first switch 3003 is switched to first transmitter 105, and connection of second switch 3004 is switched to second receiver 108. To send data from second computer 102, connection of first switch 3003 is switched to first receiver 107, and connection of second switch 3004 is switched to second transmitter 106.

As described above, transmission and reception can be switched for communication, using one bus system, in the half-duplex communication system. Although simultaneous communication of sending and receiving is not feasible, a resource required for communication path 111 of the half-duplex communication system is smaller than the full-duplex communication system.

First computer 101 and second computer 102 are coupled by communication path 111 that allows bidirectional communication. The communication system of communication path 111 is, for example, the full-duplex communication system. In this case, image recognition system 100 can easily support real-time processing.

FIG. 3A is a flow chart illustrating processing of image recognition system 100 in the first exemplary embodiment. First, learning data is learned (S1100). Learning of the learning data takes place, for example, using a computer different from both first computer 101 and second computer 102. Alternatively, learning data may be learned using second computer 102. For example, the learning data is a feature vector characterizing the recognition target obtained from an image including the recognition target.

Data generated by learning is, in general, called dictionary data. A volume of dictionary data tends to increase according to the number of types of recognition targets (e.g., pedestrians, other vehicles, and obstacles), and a capacity of mounted memory for storing the dictionary data also tends to increase.

Next, second computer 102 stores a learning result in storage unit 120 as a dictionary (S1200).

Step S1100 and Step S1200 are preliminarily executed during dictionary data creation time 1001. This is to execute subsequent Steps S1300 to S1500 for images captured by the camera in a predetermined time, which is identification time 1002 (preferably real-time execution).

Next, in identification time 1002, recognition target detector 103 detects the recognition target from the image captured by the camera (S1300), and recognition target identifier 104 inputs an identification parameter from the dictionary (S1400) to identify the recognition target (S1500).

Figure 3C:
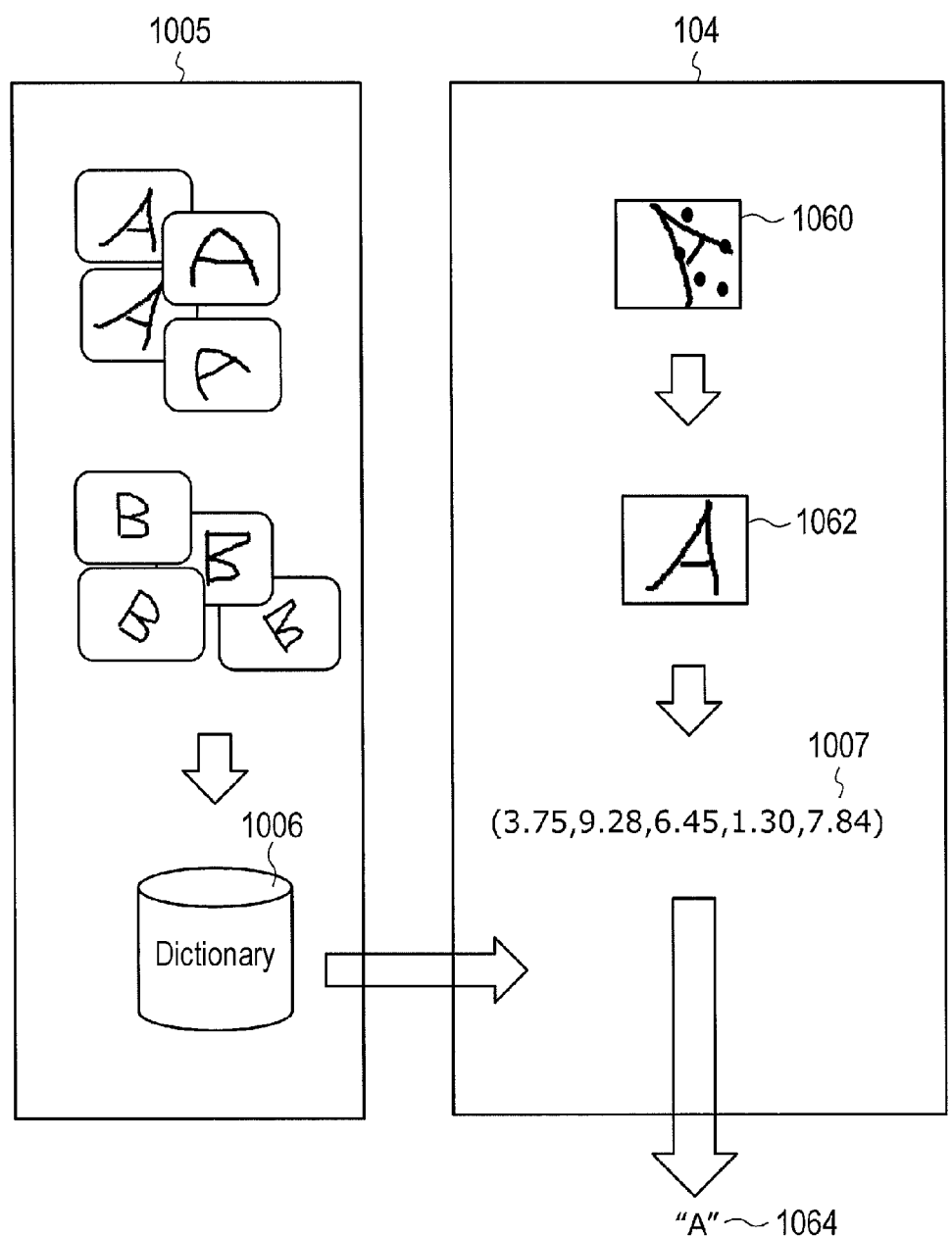
FIG. 3C is a diagram illustrating an example of identification of a recognition target in the image recognition processing.

FIG. 3B is a diagram illustrating an example of detection of the recognition target in the image recognition processing. FIG. 3C is a diagram illustrating an example of identification of the recognition target in the image recognition processing. The image recognition processing is described using an example of character recognition for simplification, with reference to FIG. 3B and FIG. 3C, but the recognition target in the image recognition system of the present disclosure is not limited to characters.

For example, handwritten characters have various shapes according to writers, although the same character is written. Therefore, during dictionary data creation time 1001, dictionary data creator 1005 inputs various shapes of the same character (e.g., alphabet "A") to generate feature vectors. These feature vectors are learned to learn features of this character (e.g., alphabet "A"). Then, the dictionary data generated by learning is added to dictionary 1006 to create dictionary 1006. Recognition target identifier 104 in image recognition system 100 refers to the dictionary data added to dictionary 1006 for identifying whether or not the character is alphabet "A."

After completing dictionary data creation time 1001, recognition target detector 103 of first computer 101 detects the recognition target in image identification time 1002. Recognition target detector 103 searches an area to be detected in image 1040 input from the camera. For example, a target character to be detected (e.g., alphabet "A") is searched while moving search area 1050 to extract image data 1060 in the search area including the target character to be detected.

Extracted image data 1060 is, for example, normalized so as to make the rotated and magnified or reduced character recognizable, and normalized image data 1062 is generated.

Then, feature vector 1007 characterizing the target character to be detected (e.g., alphabet "A") included in image data 1062 is extracted from normalized image data 1062, so as to detect the target character to be detected. For example, for extracting features of a two-dimensional image including feature vector 1007, methods, such as Histograms of Oriented Gradients (HOG), Scale-Invariant Feature Transform (SIFT), and Speeded-Up Robust Future (SURF) may be used. In HOG, a histogram of gradient directions of luminance of a local area (cell) is generated. In SIFT, the scale transition of the image and the invariant feature amount are extracted. SURF is a high-speed version of SIFT.

Next, recognition target identifier 104 identifies alphabet "A" that is target character to be detected 1064, typically by pattern matching of extracted feature vector 1007 using dictionary 1006.

Figure 4A:
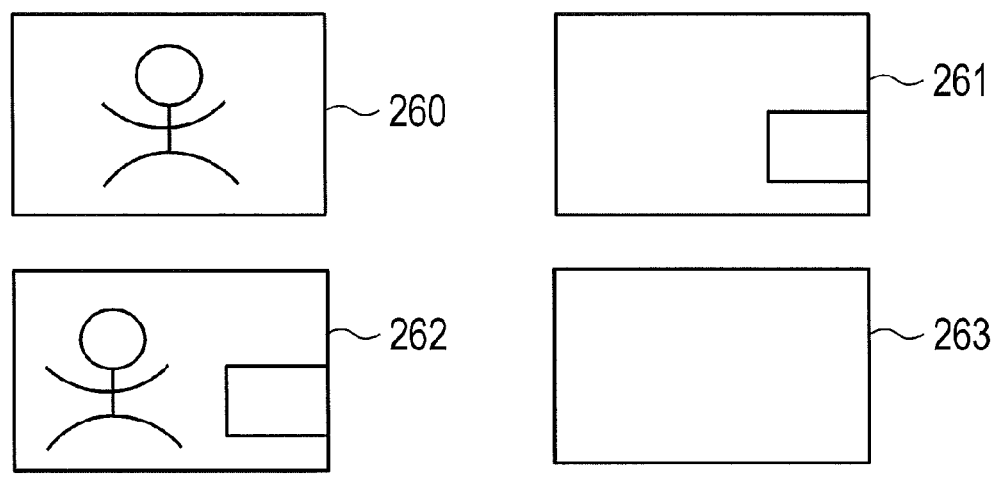
FIG. 4A is a diagram illustrating an example of images each including recognition targets of the image recognition system.

FIG. 4A shows an example of images each including the recognition target of image recognition system 100. As recognition target(s), image 260A includes a pedestrian, image 261 includes a vehicle, and image 262 includes a pedestrian and obstacle, including a vehicle. Image 263 does not include the recognition target.

Figure 4B:
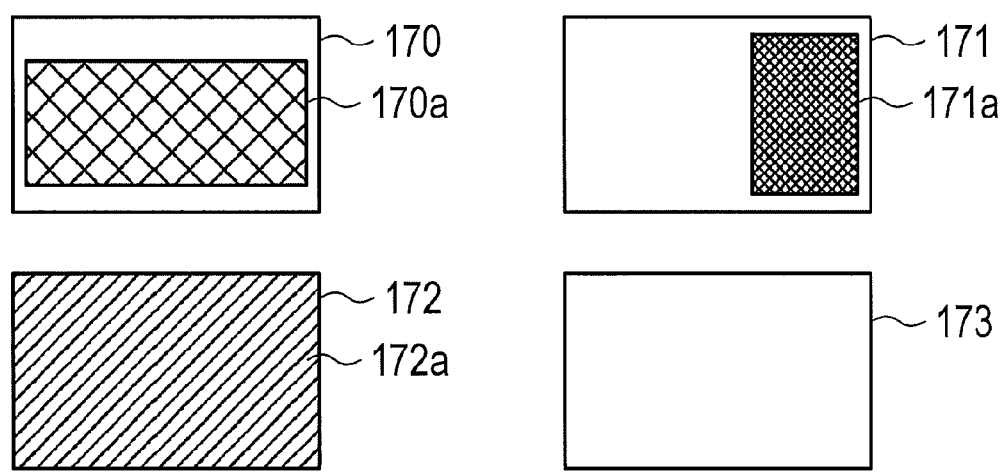
FIG. 4B is a diagram illustrating an example of setting detection areas, using a detection parameter group.

FIG. 4B shows an example of a detection area setting using a detection parameter group. To recognize the recognition target, it is necessary to set an appropriate detection area according to the recognition target. Detection area 170a indicates a detection area optimized for detecting a pedestrian in image 170. Detection area 171a indicates a detection area optimized for detecting a vehicle in image 171. Detection area 172a indicates a detection area optimized for detecting an obstacle in image 172. No detection area is set when no recognition target is recognized in image 173.

These detection areas are optimized by optimizing the detection parameter group according to the recognition target. A system for dynamically changing the detection parameter group to an optimum detection parameter group according to the recognition target enables to increase a recognition rate of recognition target in real-time processing. Still more, for example, the control switching between "performing" and "not performing" the image recognition processing for image 173 and images 170 to 172 reduces computation required for image recognition processing. This can suppress power consumption required for image recognition processing. Furthermore, variably change of the detection area required for image recognition processing can make image data not required for image recognition processing to be ignored. This can increase the recognition rate of image recognition processing.

Figure 4C:
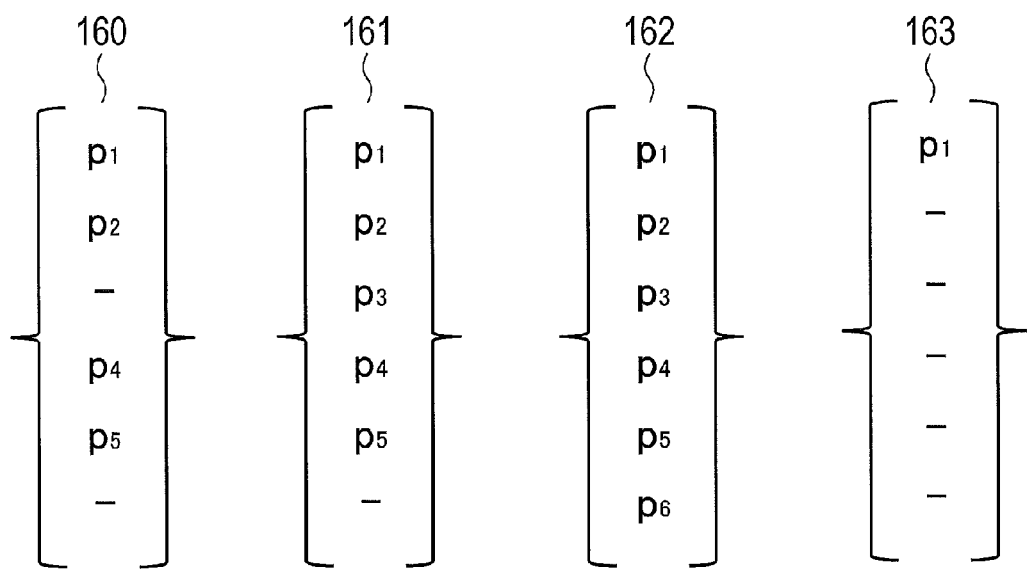
FIG. 4C is a diagram illustrating an example of the detection parameter group.
Figure 4D:
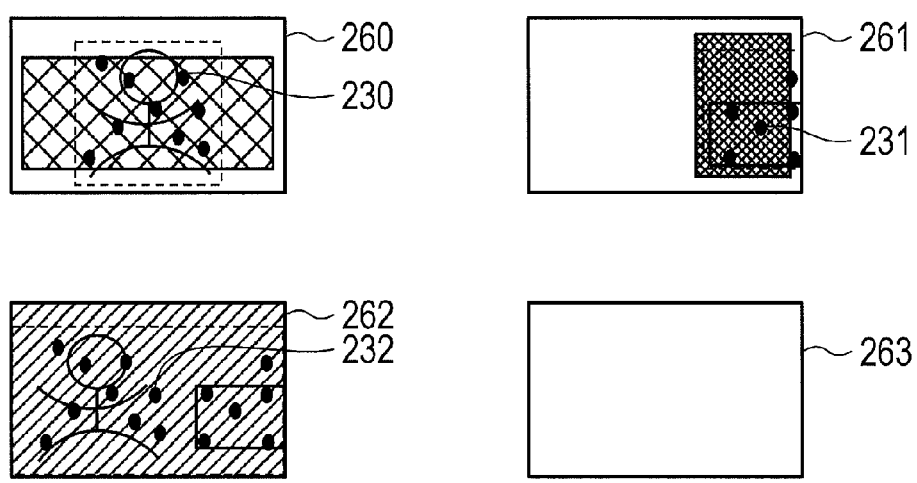
FIG. 4D is a diagram illustrating an example of feature points of the recognition targets.

The detection parameter group is, for example, parameters for setting the detection area of image recognition processing. Still more, the detection parameter group may also include parameters for algorithm selection method and extraction algorithm setting, in order to extract the feature amount, such as a feature vector. FIG. 4C shows an example of the detection parameter group. FIG. 4D shows an example of feature points of the recognition target.

To detect the recognition target in the image, the detection parameter group includes various parameters as required in addition to a parameter indicating the detection area. For example, the parameter group includes detection parameter group 160 optimized for detecting pedestrians, detection parameter group 161 optimized for detecting vehicles, detection parameter group 162 optimized for detecting obstacles, and detection parameter group 163 for not performing detection. Here, "-" means there is no corresponding parameter value. For example, parameter p1 is common to all detection parameter groups 160, 161, 162, and 163, and parameter p6, for example, is only included in detection parameter group 162 for detecting obstacles.

These detection parameter groups are updated at intervals of image data transmission (per frame). In other words, the detection parameter groups is updated to detection parameter groups 160, 161, 162, or 163 according to the detection target at shooting timing of the camera. According to the updated detection parameter group, first computer 101 generates image data and feature point data 230, 231, or 232, based on the detection area, and first computer 101 sent them to second computer 102. In this way, first computer 101 sends image data to second computer 102 for each frame, and the recognition parameter group is changed for each frame.

Parameters for surrounding scenery, time, and so on may also be added to the detection parameter group. This enables first computer 101 to optimize detection of the recognition target by referring to the detection parameter group, even though the surrounding scenery or time changes. By sending optimum detection parameter group for detecting the recognition target to first computer 101 before detecting the recognition target, the recognition rate can be increased.

Figure 5:
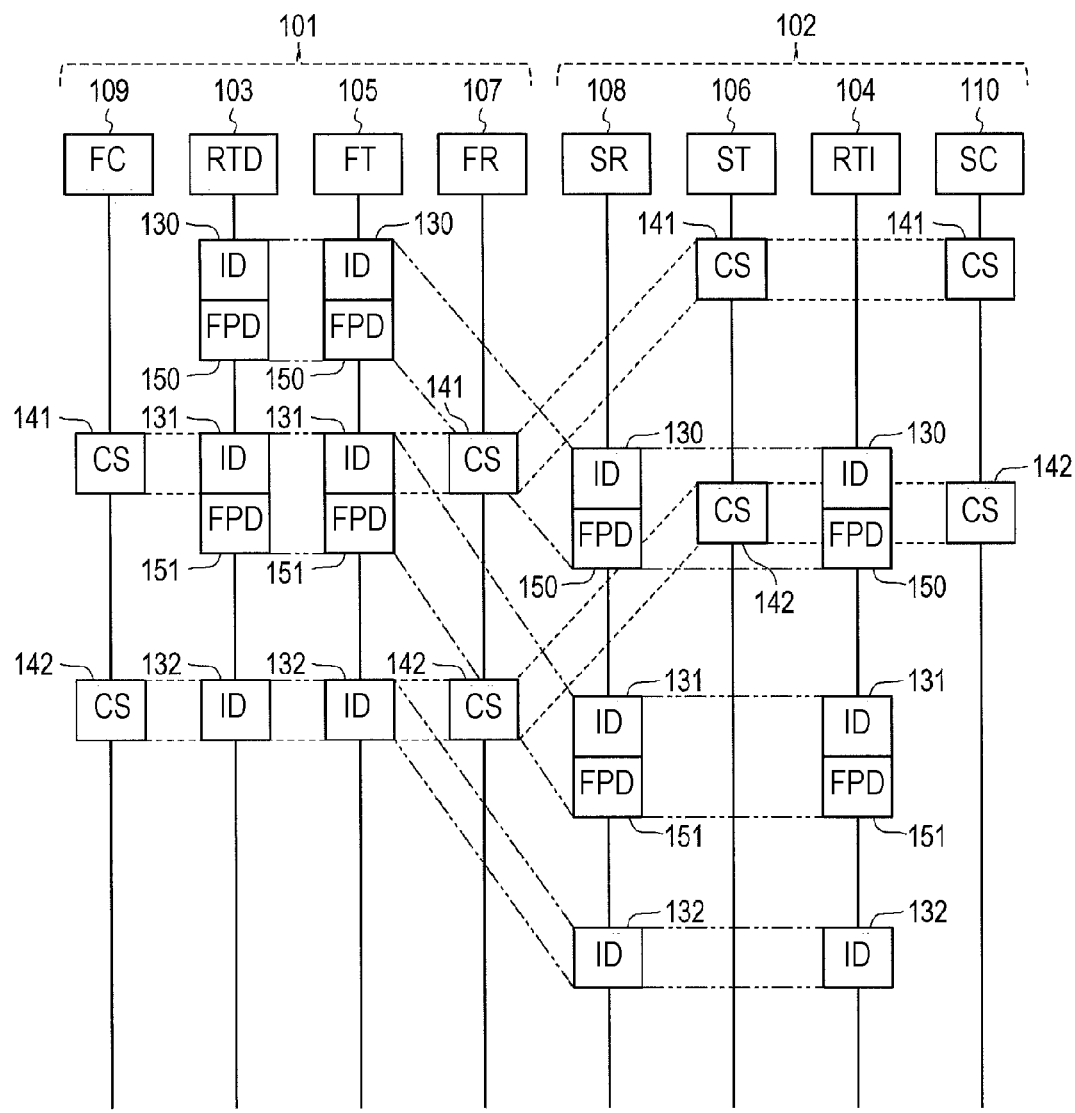
FIG. 5 is a diagram illustrating a communication flow between a first computer and a second computer.

FIG. 5 is a flow chart of communication between first computer 101 and second computer 102. The communication flow shown in FIG. 5 is for communication adopting the full-duplex communication system. Second controller 110 generates, for example, control signals 141 and 142 including the detection parameter group, and transfers them to second transmitter 106. Second transmitter 106 sends transferred control signals 141 and 142 to first receiver 107 of first computer 101. Here, the time required for transferring control signals 141 and 142 within second computer 102 is negligibly small, compared to the time required for sending from second transmitter 106 to first receiver 107.

First receiver 107 transfers received control signals 141 and 142 to first controller 109. Here also, the time required for transfer within first computer 101 is negligibly small, compared to the time required for sending from second transmitter 106 to first receiver 107. First controller 109 controls camera 115, based on control signals 141 and 142, to generate image data 131 and 132. Recognition target detector 103 extracts feature points from image data 131 and 132 to generate feature point data 151.

Next, first transmitter 105 sends image data 131 and 132 and feature point data 151 to second receiver 108 of second computer 102. Second receiver 108 transfers received image data 131 and 132 to recognition target identifier 104. Here also, the time required for transfer is negligibly small, compared to the time required for sending from second transmitter 106 to first receiver 107. Recognition target identifier 104 identifies the recognition target based on image data 131 and 132 and feature point data 151.

For transmission from second transmitter 106 to first receiver 107 and from first transmitter 105 to second receiver 108, a certain time is required. However, in the full-duplex communication system, transmission of control signal 141 and transmission of image data 130 and feature point data 150 take place in parallel. In the same way, transmission of control signal 142 and transmission of image data 131 and feature point data 151 take place in parallel.

Still more, as shown in FIG. 5, reception of control signal 141 by first receiver 107 and detection by recognition target detector 103 (generation of image data 131 and feature point data 151) take place in parallel processing. Furthermore, transmission of control signal 141 by second transmitter 106 and identification of the recognition target by recognition target identifier 104 take place in parallel processing. By communication and parallel processing using the full-duplex communication system, latency of communication between first computer 101 and second computer 102 can be concealed, even when first computer 101 and second computer 102 are disposed at positions physically separated from each other. Consequently, throughput of the computers can be efficiently demonstrated.

Figure 6:
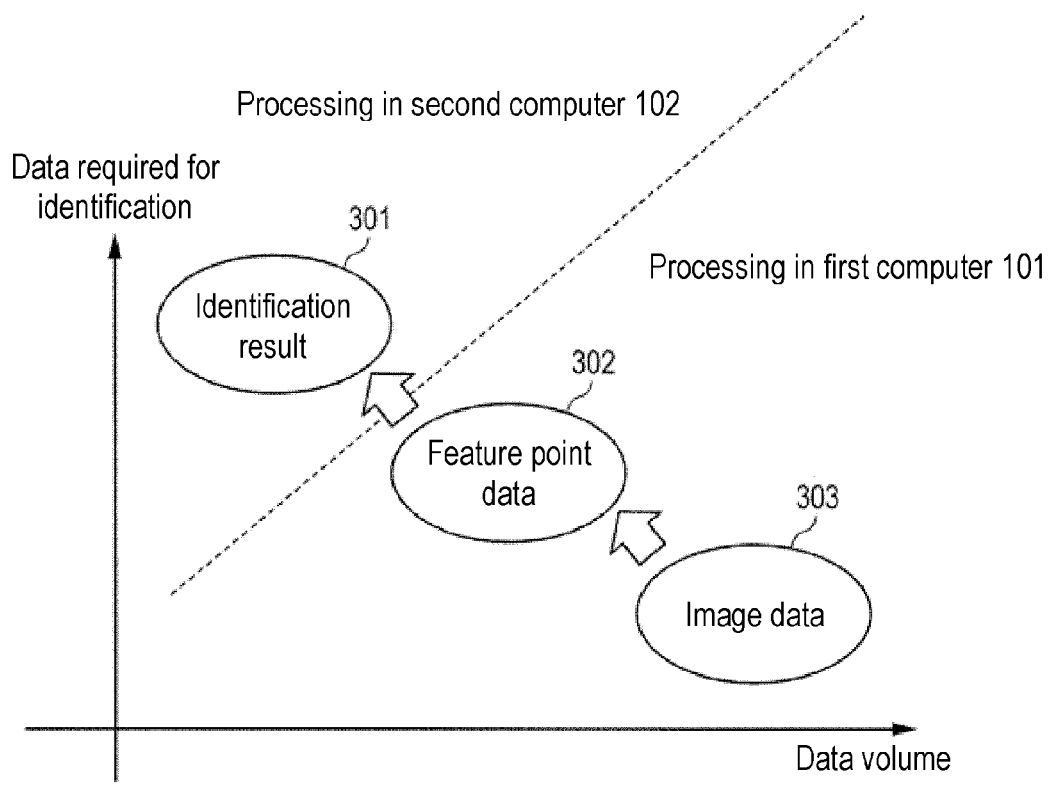
FIG. 6 illustrates the image recognition processing of the image recognition system in accordance with the first exemplary embodiment.

FIG. 6 illustrates image recognition processing in image recognition system 100 according to the first exemplary embodiment. In the image recognition processing, as shown in FIG. 6, the detection area in image data 303 is searched, pattern matching is performed between dictionary data and feature point data 302 of the recognition target detected in the detection area, and a pattern-matching result is output as recognition result 301 of the recognition target. In this image recognition processing, image data varies, typically due to individual difference between cameras and correlation among camera attachment position, background image, location, and so on, when feature point data is extracted. This makes processing complicated and increases computational effort. Also on computing recognition result 301 of the recognition target from feature point data 302, similar variations in image data occur, typically due to individual difference between cameras and correlation among camera attachment position, background image, location, and so on. This also makes processing complicated and increases computational effort.

In other words, to integrally perform image recognition processing by a processor, such as ECU, using image data obtained by single or multiple cameras, any difference caused by variations in image data, typically due to individual difference between cameras used and camera attachment position, needs to be eliminated. Accordingly, computation effort required for recognition and also resulting heat amount increase.

In the present exemplary embodiment, as shown in FIG. 6, feature point data 302 is extracted in first computer 101, and computation of recognition result 301 is performed in second computer 102. The image recognition processing is thus distributed between first computer 101 and second computer 102. Therefore, even though there are variations among image data as described above, heat amount and outer dimensions of housing of each of first computer 101 and second computer 102 can be reduced, compared to the use of an integral computer. Accordingly, even when the operating frequency or memory capacity required for recognition is increased in order to increase the recognition rate of recognition target, the present disclosure facilitates thermal design and physical layout on installing image recognition system 100. This effect is particularly remarkable when multiple cameras are used.

In the present exemplary embodiment, processing needed for image recognition is performed by parallel processing using first computer 101 and second computer 102 that are disposed at positions physically separated from each other. This facilitates thermal design and physical layout for installing image recognition system 100, although computation effort needed for image recognition and data transmission are increased. Still more, thermal design and physical layout for installing image recognition system 100 can also be further facilitated, even when the capacity of the memory for storing images required for image recognition is increased or dictionary data that increases in line with the number of types of recognition targets to be recognized and the memory size for storing the dictionary data are increased. As a result, the recognition rate of recognition target of image recognition system 100 can be further easily increased.

Still more, when an algorithm called Structure from Motion (SfM) is used for detection or identification of the recognition target, the recognition target is extracted based on a difference in multiple pieces of image data. Accordingly, the capacity of a mounted memory required for executing a recognition algorithm tends to increase depending on a detection rate of recognition algorithm adopted. Also in such a case, thermal design and physical layout for installing image recognition system 100 can be further facilitated.

Figure 7:
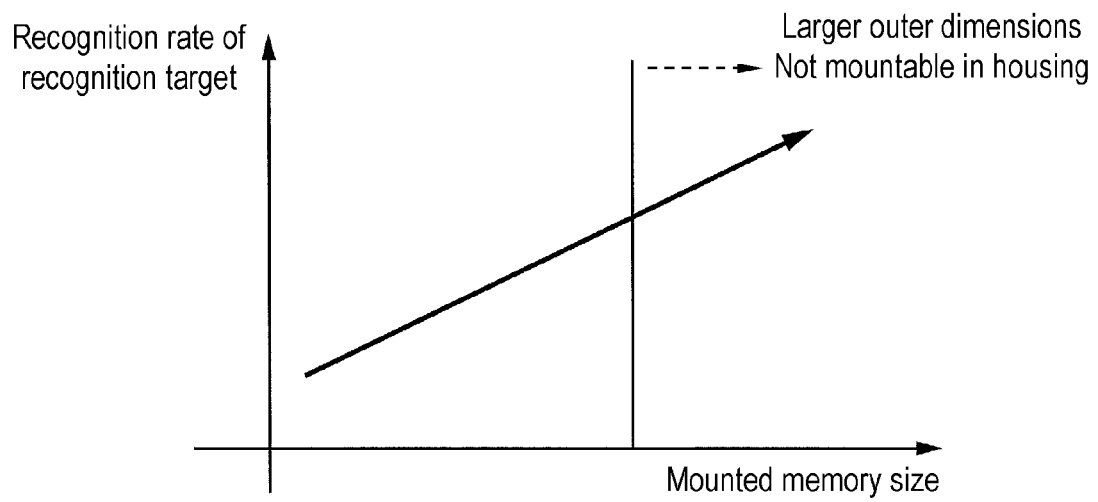
FIG. 7 is a graph illustrating a relation of a recognition rate of the recognition target and a mounted memory size.

FIG. 7 is a graph showing the relation between the recognition rate of recognition target and mounted memory size (capacity). In general, in the image recognition processing, multiple images required for image recognition are stored in the mounted memory. Therefore, as the number of types of recognition targets to be recognized or the number of recognition targets increases, a required mounted memory size tends to increase. In addition, to increase the recognition rate of recognition target, a required mounted memory size tends to increase. When the required mounted memory size becomes equal to or more than a certain size, a physical area and outer dimensions to be needed enlarge and the memory may become impossible to be installed in the housing.

Also in this case, image recognition system 100 can reduce a physical area and outer dimensions of each of first computer 101 and second computer 102, compared to the use of an integral computer, and thus the computers can be easily installed in the housings.

Furthermore, in image recognition system 100, the recognition target can be dynamically changed according to various occasions, and thus real-time recognition rate of recognition target can be increased.

Second Exemplary Embodiment

For the image recognition algorithm in image recognition system 100 described in the first exemplary embodiment, deep learning can also be adopted. To increase a recognition rate on constructing the image recognition system, an uniquely-tuned recognition parameter group is provided for each of the detection area, the feature extraction, the dictionary data creation, the pattern matching, and so on. A designer who constructs the image recognition system manually prepares each recognition parameter group, assuming target images to be recognized and operating conditions. The recognition rate of recognition target also differs by a camera to be used and setting of recognition parameter group according to occasion.

Still more, for real-time recognition of different recognition targets in the image recognition system used in automated driving vehicles and robots, it is important to increase the recognition rate of real-time recognition processing. There are various indexes for recognition rate, but for image recognition processing of moving recognition targets, such as moving objects, it is particularly important to improve recognition rate of real-time recognition processing.

For this reason, a method called deep learning has been increasingly drawing attention as a method that reduces manual preparation or achieves full-automated preparation of recognition parameter groups in construction of such image recognition system.

Deep Learning

To increase the recognition rate in real-time recognition processing, a volume of dictionary data needs to be increased, and thus a volume of learning data used for computation of recognition parameter groups also increases. Therefore, a large volume of data, such as learning data, is often stored in a server as big data. It is difficult to manually optimize recognition parameter groups for image data recognition algorithm, using this large volume of data. Instead of having a designer constructing image recognition system set recognition parameter groups as intended, recognition algorithm and recognition rules are automatically generated, using stored large volume of data. Using this auto-generated recognition algorithm and rules, meaning of input image is automatically predicted.

Figure 8:
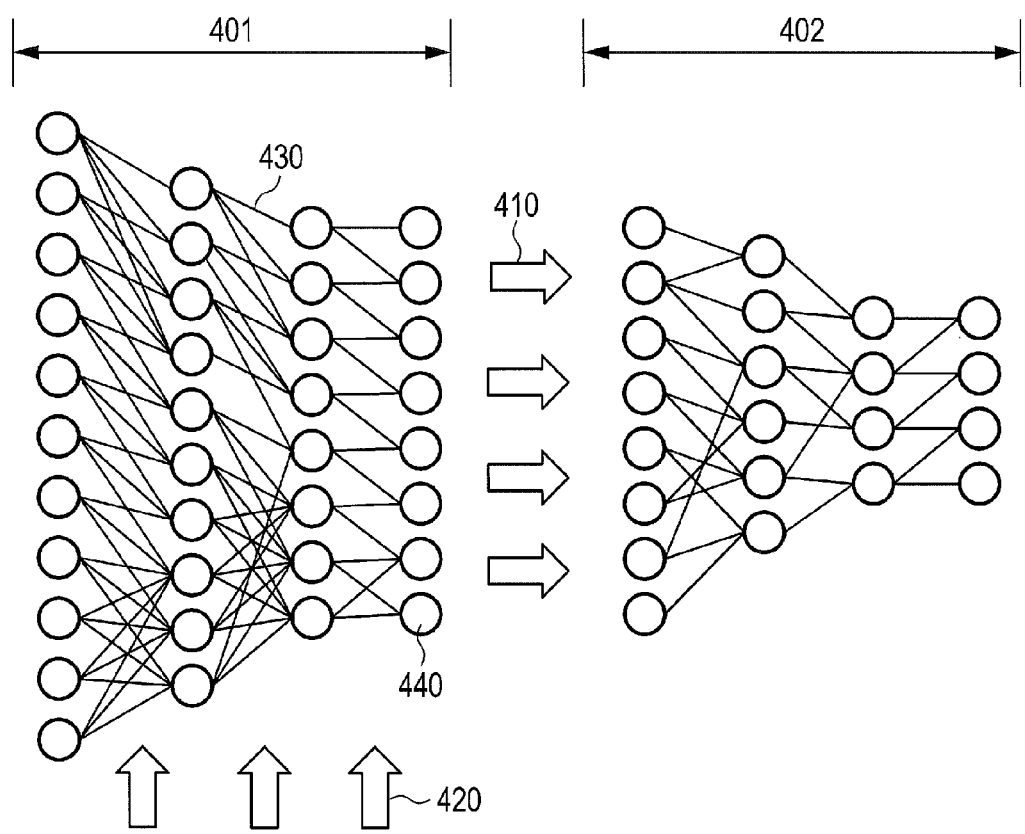
FIG. 8 is a diagram illustrating an example of a neural network employed in deep learning.

FIG. 8 shows an example of neural network used for deep learning. In contrast to a conventional neural network having, for example, three-layer structure, deep learning has a neural network of relatively deep layered structure. Neurons 440 are coupled between adjacent layers by synapse 430.

An example of mathematical model of single neuron is expressed with Formula (1) below.

$$y = f_k\left(\sum_{i=1}^{n} x_i w_i - \theta\right) \quad (1)$$

Where, "y" represents an output signal value of certain neuron 440, "$f_k$" represents a function, such as the sigmoid function, "n" represents the number of neurons in lower layers under certain neuron 440, "$x_i$" represents an output signal value of $i^{th}$ neuron 440 in the lower layers, "$w_i$" represents a synapse weight of synapse 430 connected from $i^{th}$ neuron 440 in the lower layer to certain neuron 440, and "θ" is certain threshold.

It is apparent from above Formula (1) that neuron 400 fires when a value of product-sum calculation of neuron 400 in the lower layer and synapse weight of synapse 430 exceeds threshold θ, and its signal propagates through neural networks 401 and 402. For example, neural network 401 is used for the image recognition processing, and neural network 402 is used for action control. In this case, a value of synapse weight "$w_i$" serves as a recognition parameter group for image recognition.

First, image data stored typically in an external server is used for learning in hierarchical neural networks 401 and 402 by deep learning. Then, based on a neural network structure formed by learning and synapse weight, a neural network structure is obtained. Recognition data 410 of image recognition is output from neural network 401 for image recognition processing.

In the deep learning, the recognition rate of recognition target increases by optimizing the synapse weight of neural network specified for the recognition target to be recognized. Therefore, based on change data 420 of synapse weight, the recognition parameter group optimized for each recognition target to be recognized is dynamically changed. This can increase a real-time recognition rate of recognition target.

In the recognition parameter group based on deep learning, function "$f_k$" in Formula (1) may be included, or threshold "θ" may be included.

In a general neuron model shown by Formula (1), a network structure may be dynamically changed by setting at least one of the synapse weights to 0 (zero) to change the network structure of neural network.

As described above, first computer 101 may detect the recognition target by employing the neural network. In this case, the detection parameter group is at least one of the synapse weight, function, and threshold of neuron configuring the neural network.

Third Exemplary Embodiment

Figure 9:
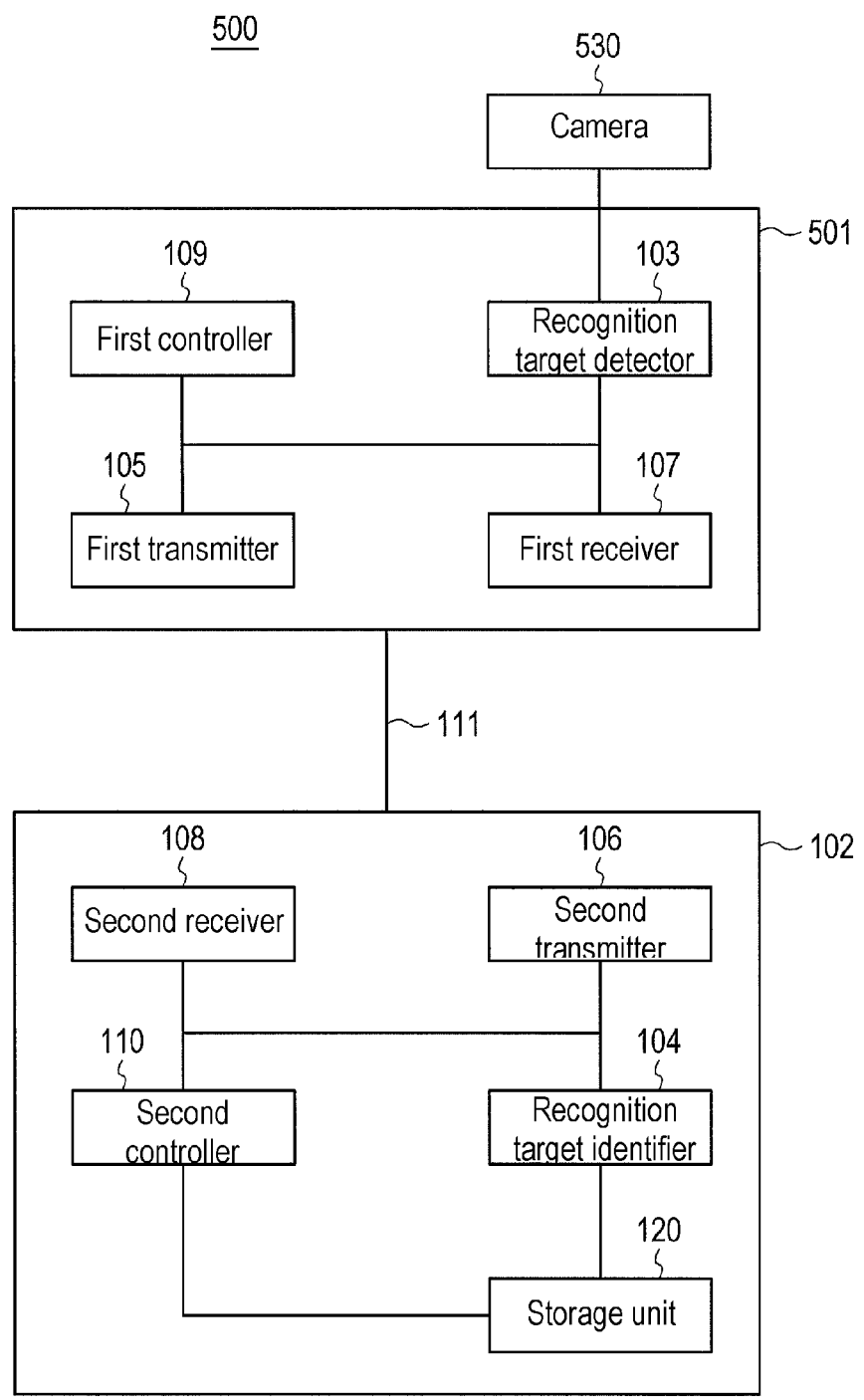
FIG. 9 is a diagram of an image recognition system in accordance with a third exemplary embodiment.

FIG. 9 is image recognition system 500 according to a third exemplary embodiment of the present disclosure. Image recognition system 500 includes first computer 501, second computer 102, and camera 530. Second computer 102 in the third exemplary embodiment has the same configuration as second computer 102 in the first exemplary embodiment, and thus its description is omitted here.

First computer 101 in the first exemplary embodiment includes camera 115 inside. Conversely, first computer 501 in the third exemplary embodiment is connected to separate camera 530. First computer 501 in the third exemplary embodiment differs from first computer 101 in the first exemplary embodiment at this point. By providing first computer 501 and camera 530 separately, image recognition system 500 in the third exemplary embodiment can further prevent concentration of heat generated due to processing, compared to that of image recognition system 100 in the first exemplary embodiment. In this way, camera 530 for obtaining image data may be disposed physically separated from first computer 501 and connected to first computer 501.

Fourth Exemplary Embodiment

Figure 10:
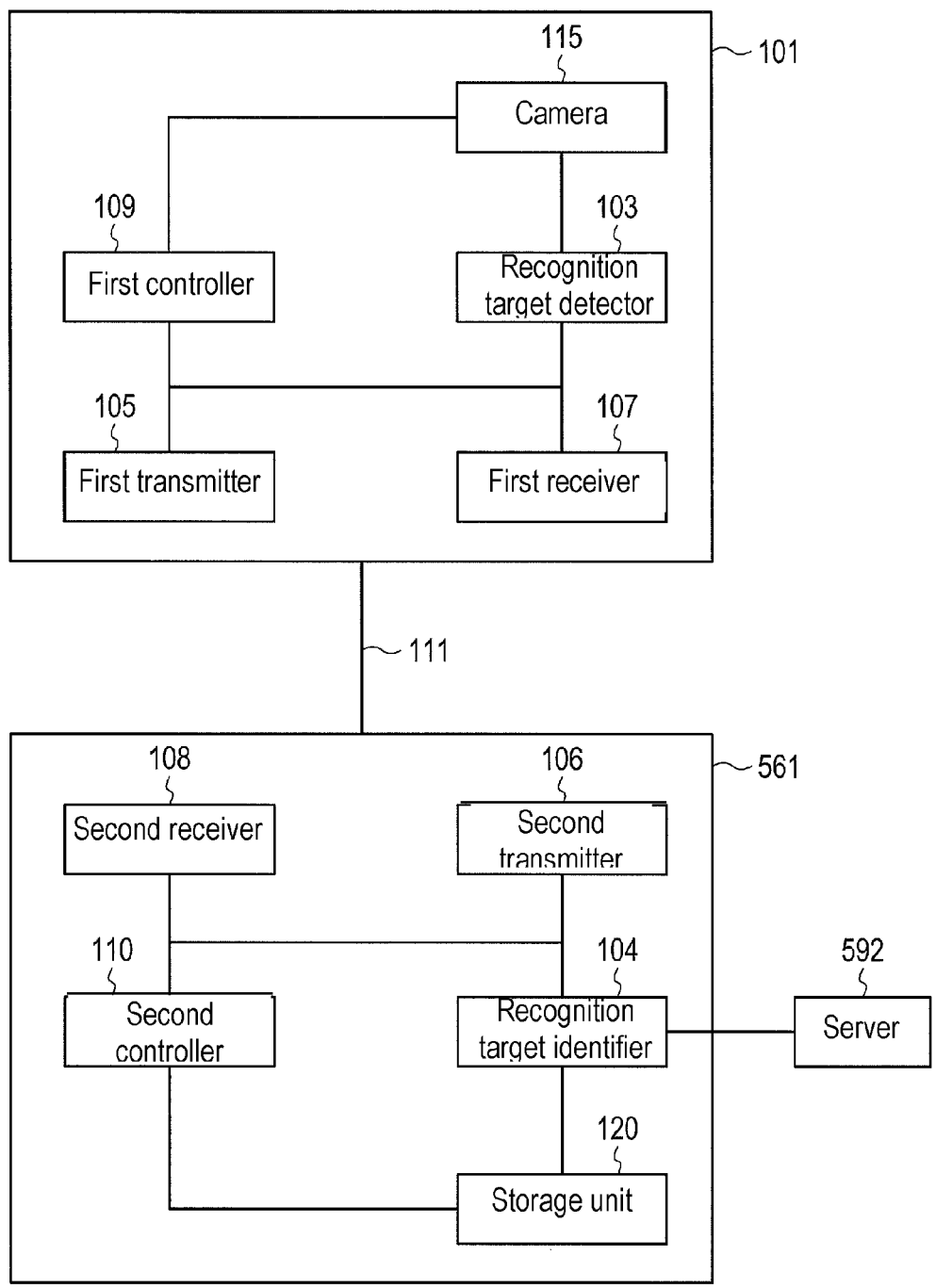
FIG. 10 is a diagram of an image recognition system in a fourth exemplary embodiment.

FIG. 10 is image recognition system 500A according to a fourth exemplary embodiment of the present disclosure. Image recognition system 500A includes first computer 101, second computer 561, and server 592. First computer 101 in the fourth exemplary embodiment has the same configuration as first computer 101 in the first exemplary embodiment, and thus its description is omitted here. Second computer 561 obtains part or all of recognition parameter groups from server 592 connected to second computer 561, instead of storing the recognition parameter groups in a memory of recognition target identifier 104. As required, second computer 561 sends a result of image recognition by second computer 561 to server 592.

To increase the recognition rate for various recognition targets, (e.g., pedestrians, other vehicles, and bicycles), a dictionary needs to contain a large volume of dictionary data. By storing the dictionary in server 592 and obtaining dictionary data from the dictionary stored in server 592 by second computer 561 as required, an increase in a data memory size of recognition target identifier 104 in second computer 561 performing image recognition and an increase in a memory capacity of storage unit 120 can be suppressed. This can suppress a heat generated from data memory, and also the outer dimensions of second computer 561 can be small. Still more, when the recognition parameter group changes rapidly, image recognition system 500A can obtain the latest recognition parameter group from server 592 and use it.

Furthermore, to perform image recognition in a moving vehicle, for example, image data from the vehicle of various places to which the vehicle travels at different times are needed. This generally requires a large volume of image data for creating a dictionary. Also in this case, image data from the vehicle can be stored in server 592 and create the dictionary in server 592.

Fifth Exemplary Embodiment

Figure 11:
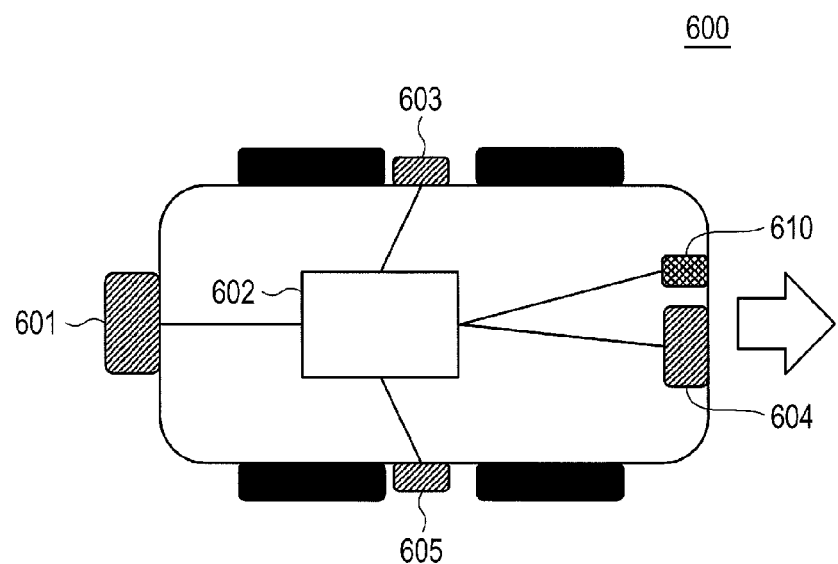
FIG. 11 is a diagram of an image recognition system in accordance with a fifth exemplary embodiment.

FIG. 11 shows image recognition system 600 according to a fifth exemplary embodiment of the present disclosure. Image recognition system 600 includes first camera 601, second camera 603, third camera 605, and fourth camera 604 as first computers, ECU 602 as a second computer, and ranging sensor 610. First camera 601, second camera 603, third camera 605, fourth camera 604, and ranging sensor 610 are connected to ECU 602.

For example, when a vehicle moves forward, fourth camera 604 detects an obstacle ahead, second camera 603 and third camera 605 are turned off, and first camera 601 detects a following vehicle. When the vehicle turns to the right, fourth camera 604 detects an obstacle ahead, third camera 605 detects a pedestrian at the right to avoid an accident due to turning, second camera 603 detects a vehicle at the left, and first camera 601 detects a following vehicle.

For example, ranging sensor 610 is connected to ECU 602. Image data of fourth camera 604 and ranging data of ranging sensor 610 may be synthesized to prepare three-dimensional image to be used for detecting an obstacle ahead. Ranging sensor 610 is capable of measuring a distance to a recognition target, and is, for example, a milliwave sensor or a sonar sensor. By constructing the image recognition system using multiple cameras 601, 603, 605, and 604, and ranging sensor 610, the recognition rate of recognition target can be further increased.

Other Exemplary Embodiments

First computer 101 in the first exemplary embodiment performs detection, but first computer 101 may additionally perform part of identification, instead of second computer 102.

First computer 101 in the first exemplary embodiment includes camera 115. In addition to camera 115, for example, LIDAR (Light Detection and Ranging or Laser Imaging Detection and Ranging) may be used to combine image data from camera 115 and image data from LIDAR and to prepare three-dimensional image data to be used for detecting and/or identifying a recognition target.

INDUSTRIAL APPLICABILITY

The present disclosure relates to image recognition systems and machines to which any of the image recognition systems is installed, and is applicable typically to image recognition systems installed in machines with autonomous operations, such as autonomous vehicles and industrial robots.

REFERENCE MARKS IN THE DRAWINGS

100 Image recognition system
101 First computer
102 Second computer
103 Recognition target detector
104 Recognition target identifier
105 First transmitter
106 Second transmitter
107 First receiver
108 Second receiver
109 First controller
110 Second controller
111 Communication path
115 Camera
120 Storage unit
130 Image data
131 Image data
132 Image data
141 Control signal
142 Control signal
150, 151 Feature point data
160, 161, 162, 163 Detection parameter group
170, 171, 172, 173 Image
170a, 171a, 172a Detection area
230, 231, 232 Feature point data
260, 261, 262, 263 Image
301 Recognition result
302 Feature point data
303 Image data
401, 402 Neural network
410 Recognition data
420 Change data of synapse weight
430 Synapse
440 Neuron
500, 500A Image recognition system
501 First computer
530 Camera
561 Second computer
592 Server
600 Image recognition system
601 First camera (camera)
602 ECU
603 Second camera (camera)
604 Fourth camera (camera)
605 Third camera (camera)
610 Ranging sensor
1005 Dictionary data creator
1006 Dictionary
1007 Feature vector
1040 Image
1050 Search area
1060 Image data
1062 Image data
1064 Target character to be detected
2000, 2000A Image recognition system
2001, 2001A On-vehicle camera
2002 Vehicle
2003, 2003A ECU
2004 Mutual communication path
2005 Dictionary
2006 Recognition target detector
2007 Recognition target identifier
2010 First image processor
2040 Second image processor
3003 First switch
3004 Second switch
3023 First modem
3024 Second modem
3027 Transmission
3028 Reception

The invention claimed is:

1. An image recognition system comprising:
a first computer which, in operation, detects a feature point data of a recognition target from image data obtained by at least one camera, using a detection parameter group;
a second computer which, in operation, identifies the recognition target detected by the first computer; and
a communication path between the first computer and the second computer,
wherein the first computer and the second computer are disposed at positions physically separated from each other,
the recognition target includes at least one of a pedestrian, a vehicle and an obstacle,
the detection parameter group is included in a recognition parameter group that is dynamically changed according to recognition target and used for image recognition processing of the image data,
the second computer sends the detection parameter group to the first computer via the communication path when the first computer sends the image data to the second computer,
the first computer sends to the second computer the image data and the feature point data detected based on the detection parameter group sent from the second computer, and
the second computer identifies the recognition target based on the image data and the feature point data sent from the first computer.

2. The image recognition system according to claim 1, wherein a communication system of the communication path is a full-duplex communication system in which transmission of the image data and transmission of the detected parameter group are performed in parallel.

3. The image recognition system according to claim 1, wherein the recognition parameter group is at least a part of a parameter group that characterizes a recognition target to be recognized.

4. The image recognition system according to claim 1, wherein the first computer detects the recognition target, using a neural network, and
the detection parameter group is at least one of a synapse weight, a function, and a threshold of a neuron configuring the neural network.

5. The image recognition system according to claim 4, wherein the synapse weight is one of a plurality of synapse weights, and a configuration of the neural network is changed by setting zero to at least one of the plurality of synapse weights.

6. The image recognition system according to claim 1, wherein the first computer sends the image data to the second computer on a frame-by-frame basis, and the recognition parameter group is changed on the frame-by-frame basis.

7. The image recognition system according to claim 1, further comprising the at least one camera that is disposed at a position physically separated from the first computer and connected to the first computer,
wherein the at least one camera, in operation, obtains the image data.

8. The image recognition system according to claim 1, further comprising a server connected to the second computer,
wherein the second computer obtains at least one parameter of the recognition parameter group from the server, and sends information on a result of recognition by the second computer to the server.

9. The image recognition system according to claim 1, further comprising a ranging sensor which is connected to the second computer and, in operation, measures a distance to the recognition target.

10. The image recognition system according to claim 1, wherein the first computer is one of a plurality of first computers, and the image recognition system includes the plurality of first computers.

11. The image recognition system according to claim 1, wherein communication via the communication path is wireless communication.

12. The image recognition system according to claim 1, wherein a detection parameter group provided for the pedestrian is different from a detection parameter group provided for the vehicle or the obstacle.

* * * * *